J. R. ABBE.

MACHINE FOR HEADING BOLTS.

No. 3,414. Reissued May 4, 1869.

Witnesses,
A. Sellers
A. Kinnier

Inventor.
J. R. Abbe
per Brown Coombs & Co
attys

United States Patent Office.

JOHN R. ABBE, OF PROVIDENCE, RHODE ISLAND.

*Letters Patent No.* 85,983, *dated January* 19, 1869; *reissue No.* 3,414, *dated May* 4, 1869.

IMPROVEMENT IN MACHINES FOR HEADING BOLTS.

The Schedule referred to in these Letters Patent and making part of the same.

*To all whom it may concern:*

Be it known that I, JOHN R. ABBE, of Providence, in the county of Providence, and State of Rhode Island, have invented a new and useful Improvement in "Bolt-Heading Machines," of which the following is a full, clear, and exact description, reference being had to the accompanying drawing, forming part of this specification, and in which—

Figure 1:
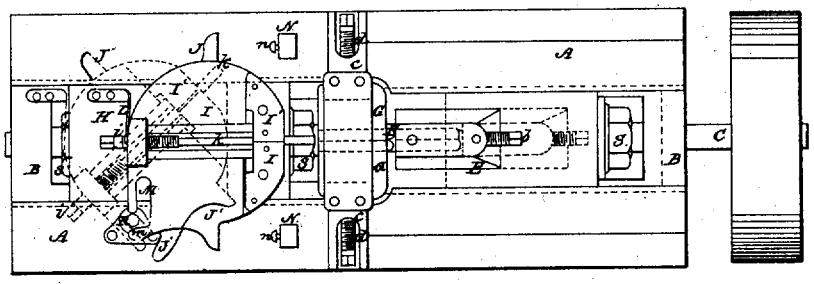
Figure 2:
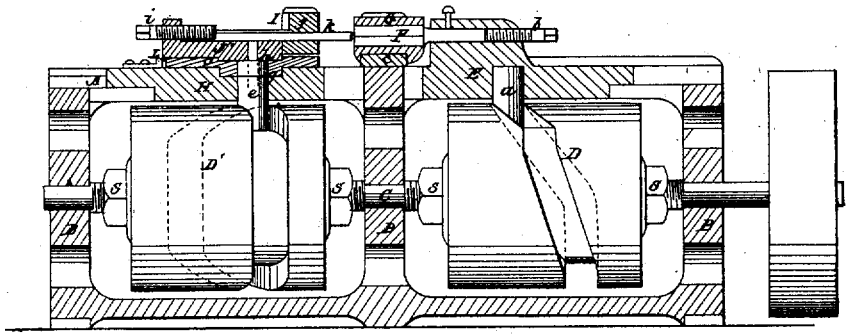

Figure 1 represents a plan of a bolt-heading machine constructed in accordance with my improvement; and Figure 2, a longitudinal sectional elevation of the same.

Similar letters of reference indicate corresponding parts.

My invention consists in a combination, with stationary dies that constitute a "former," of an intermittently-reciprocating upset working therein, and jaws which contain dies for clamping the bolt, and which, in addition to having an intermittently-reciprocating motion toward and from the stationary dies, have a swinging and opening and closinr action, to facilitate the entry and discharge of the bolt within and from them; the upset and jaws having their intermittently-reciprocating motions communicated to them through sliding heads or frames by a revolving grooved cam or cams attached to a shaft, arranged to run lengthwise of the machine, while the swinging and opening and closing motions of the jaws are effected by turning-supports to them, through a slot made in one of the supports, acting against a pin fixed to the bed.

In the accompanying drawing—

A is the bed of the machine, supported on or by suitable uprights, B.

Arranged to run longitudinally of the machine, and working in bearings made in the uprights B, is a main or general driving-shaft, C, on which is hung a grooved cam or cams D D′.

The one, D, of these cams, serves to give intermittently-reciprocating motions, through a pin, *a*, fitting the groove in said cam, to a frame or head, E, arranged to slide longitudinally of the bed, within or on ways connected therewith.

This head E carries the upset F, which is made adjustable longitudinally by a back-screw, *b*. The front end of said upset is dished or chamfered, to give the necessary chamfer to the bolt-head.

G G are stationary dies arranged between blocks *c c*, which are provided with screws *d d*, for the purpose of adjusting or setting said dies relatively to each other. These dies G G constitute the "former," and are of an internal configuration, in their transverse section, corresponding to the cross-section of the upset, and of the shape of the head to be made on the bolt. The upset F works, as it is intermittently reciprocated, through said dies or "former," that is of a shape and size to snugly yet freely fit said dies.

The cam D′ serves to give intermittently-reciprocating motion or motions, through a pin, *e*, fitting the groove in said cam, to a head or plate, H, also arranged to slide longitudinally of the bed, within or on ways connected therewith.

This head or plate H serves to carry the bolt-holding clamps or jaws I I′, which are fitted with suitable dies, *f*, covered by cap-plates, for griping the bolt in between them.

The one, I, of these jaws, both of which may be reversible, with different-sized bolts, is formed of or by a projection from a supporting-table or plate, J, which is let into the head, H, as at *g*, so as to travel along with said head, but so that it is capable of being turned horizontally around the pin *e* as a centre.

The other jaw, I′, forms a similar projection from a supporting-table, J′, which is arranged to turn in or on, as at *h*, the lower table J.

This upper table J′ is provided, at its back, with an adjusting-screw, *i*, against which the end of the rod *k*, forming the bolt, is made to but, said screw being adjusted to suit different lengths of bolts. It is preferred to make said screw hollow, and to furnish it with a spring-pin, which being struck by a hammer, will throw out the bolt after it has been headed.

L is a spring connected with the head, H, and biting into a notch in the edge of the lower table J, to hold the table from turning when the jaws are closed and in line with or facing the "former."

The upper table, J′, has a slot, M, made in it, at or near its back, on one side of its centre, said slot terminating, at its outer end, in a mouth or opening, *m*.

N N are stops, provided with adjusting-screws *n n*, to arrest, at the proper time, the forward movement of the jaws or tables which carry them.

The cams D D′ are adjustable, by nuts S S, on or along the shaft C, to adjust or vary the pressure of the upset F on the bar, and the feed of the jaws I I′ up against the stationary dies G G.

To insert the bar or rod *k*, or to deliver the bol made therefrom through the dies of the jaws I I′, the latter, with their tables J J′, are turned as indicated by red lines in fig. 1, which action is accomplished, each back feed of the head, H, by the mouth *m*, of the slot M, receiving within or through it a stationary pin, R, that, in being struck by the inner edge of the slot M, effects the turning of the upper table, J′, to the position shown in red lines, said edge of the slot travelling against or over the pin R, and said table acting against the jaw I of the under table, J, to simultaneously turn it. The jaws, in thus being turned out of line with the dies G G, or upset F, are also opened, by a slight play established between the upper table J′, and jaw of the under table, and drag of the spring on the latter.

The bar or rod *k* having been inserted, the succeeding forward movement of the head or plate H, through the action of the cam D′ on the pin R, causes the outer edge of the slot M to bear or rub over the pin R, and thereby to close the jaws on the bar, and to turn them back to face the dies G G, which is the position represented for them by black lines, and in this position they are held, after the mouth *m* of the slot M has left the pin R, by the spring L, shooting into the notch in the edge of the lower table J.

The cams D D′ are so grooved or formed as to secure the following action of the jaws I I′ and upset F, in relation to each other, in heading the bolt within the "former" or dies G G, and after the head has been formed, to secure its retirement therefrom.

The jaws having been closed and turned, to gripe the rod or bar, and to bring it in line with the upset, are moved up toward or against the face of the dies G G, which project the rod into the "former," where it remains, while the upset F advances to form the head on the bolt, the upset preferably remaining stationary a short interval, while the head is being formed, after which the jaws move in a back direction, and the upset F follows in the same course, to push the bolt, by pressure on its head, out of the "former" or dies G G. A further-continued back movement of the jaws effects the turning and opening of them, as hereinbefore described, to admit of the headed bolt being removed, and a fresh bar or rod inserted, the upset F, in the mean time, retiring, to repeat the heading-operation on the next advance movement of the jaws.

A machine thus constructed and operating, has the pressure requisite for heading distributed over numerous parts, and bolts may be made or headed without fins on them, while every facility is afforded, in an automatic manner, for insertion of the rod or bars, also removal of the headed bolt, and all necessary adjustments by the several screws, or, it may be, wedges provided for.

What is here claimed, and desired to be secured by Letters Patent, is—

1. The reciprocating swivelled jaws J J′, provided with slot M, and constructed substantially as described, in combination with the pin R on the frame, all arranged and operating essentially as shown and described.

2. In combination with the swivelled jaws J J′ and pin R, the spring pawl L, operating to hold and open the said jaws, in the manner set forth.

3. The stops N, with their adjusting-screws *n*, in combination with the reciprocating swivelled jaws, operating automatically to close the said jaws, substantially as described.

4. The swivelled jaws J J′, having an oscillating motion around the centre *h*, in combination with the reciprocating table H, substantially as shown and described.

5. The combination, with the stationary dies or former G G, of the intermittently-reciprocating upset F, cam or cams D D′, and intermittently-reciprocating jaws I I′, arranged to have a lateral or turning and opening and closing action, and the several parts being adjustable, to regulate the pressure to suit different-sized bolts, substantially as shown and described.

Witnesses: JOHN R. ABBE.

GEO. A. BURNHAM,

THEODORE W. PHILLIPS.